June 26, 1962 T. F. JABLONSKI 3,040,466
FISH HOOK WEED GUARD
Filed June 5, 1957
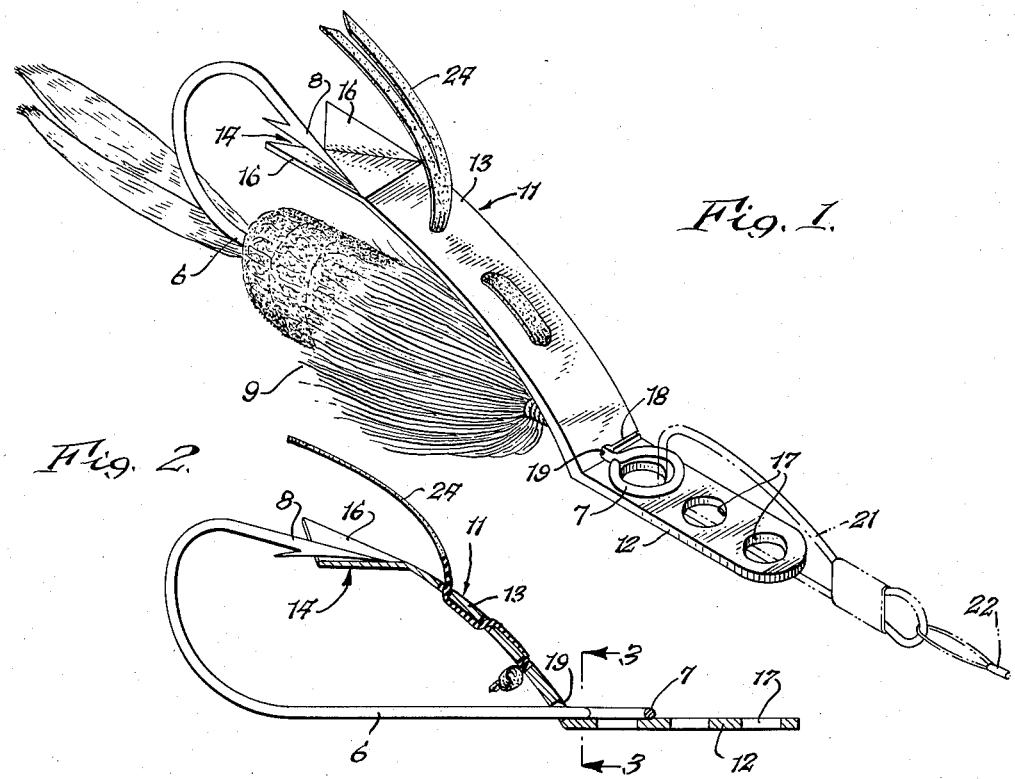
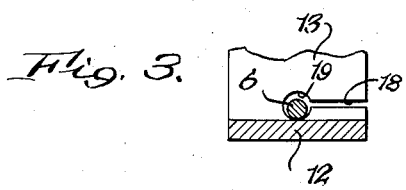
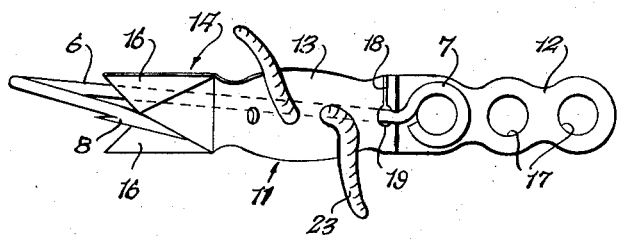
INVENTOR.
Theodore F. Jablonski
BY
Popp and Sommer
ATTORNEYS.

United States Patent Office 3,040,466
Patented June 26, 1962

3,040,466
FISH HOOK WEED GUARD
Theodore F. Jablonski, 1081 Genesee St., Buffalo, N.Y.
Filed June 5, 1957, Ser. No. 663,755
1 Claim. (Cl. 43—42.09)

This invention relates to fish hooks, and more particularly to a weed guard which may be used with a variety of fish hooks.

The weed guard of the present invention represents an improvement in fish hook weed guards, and features a single piece construction having adjustable mounting means for use with various size and type fish hooks. The weed guard may be easily applied to a fish hook, and may be quickly removed for use with another fish hook if desired. When used with a fish hook having a right or a left hand offset barb, the weed guard of the invention will automatically adjust itself thereto, and in so doing will provide a slightly warped surface which results in a wiggling or swaying motion of the hook assemblage as it is drawn through the water, thus producing an artificial lure effect.

The main object of this invention is to provide a fish hook weed guard which may be used with a variety of fish hooks.

Another object of the invention is to provide a fish hook weed guard which may be easily applied or removed from a fish hook.

Still another object of the invention is to provide a fish hook weed guard which, when used with hooks having an offset barb, will automatically adjust itself thereto, and will provide a warped surface resulting in a wiggling or swaying motion as the assemblage is drawn through the water.

These and further objects and features of the invention will become more apparent from the following description and the accompanying drawing wherein:

FIG. 1 is a perspective view illustrating a weed guard embodying the principles of the invention as applied to a fish hook;

FIG. 2 is a side view of the assemblage of FIG. 1, with the weed guard in cross section;

FIG. 3 is a section view as seen from line 3—3 in FIG. 2; and

FIG. 4 is a plan view of the weed guard as applied to a hook.

Referring now to the drawing, the numeral 6 identifies a relatively straight shank body portion of a fish hook having an eye 7 at one end, and a barb 8 at the other end, the vertical portion of the hook containing the barb being substantially at a right angle to the plane of the eye 7. The barb 8 may be straight, or offset relative to the body portion 6, as best seen in FIG. 4. The fish hook may be of the usual type with, or without, a fly 9 or other arificial bait affixed thereto.

A weed guard 11, embodying the principles of the invention, is formed of a flexible material, preferably a plastic, such as polyethylene, having a flat elongated attachment broad base portion 12, and a curved finger portion 13 arranged at an angle and transverse with respect to one broad face of the attachment portion 12, and including a trough section 14 at the free end, which engages and partially encloses the barb end of the fish hook. As best seen in FIG. 2, the curved portion 13 tapers in thickness, being thickest in the region where it joins with the attachment portion 12, thus providing strength to resist flexing by weeds or similar objects, and at the same time allowing the necessary flexibility so that the trough section 14 may be urged away from the barb 8 by a fish when it strikes, or "takes the bait."

The trough section 14, has tabs, or wings 16 which are V-shaped in end projection and which function to guide the end of the curved portion 13 into engagement with the underside of the barb 8. When the weed guard 11 is used on a hook having a right or left hand offset barb, the wings 16 assist in skewing, or warping the curved portion 13, as best seen in FIG. 4, so that a wiggling or swaying motion is produced as the hook assemblage is drawn through the water.

The weed guard curved portion 13 is relatively broad in width, about 5⁄16″ for example, so that it serves as a shield, or buffer, for bait on the hook, thus helping to protect the bait from wear due to water friction, or pressure, while being drawn through the water.

Attachment portion 12 is formed with a plurality of holes 17 arranged in alignment, each of said holes being adapted for positioning beneath the eye 7 of a fish hook. A horizontal slot 18, having an enlarged inner end 19, through which the body 6 of the hook extends, is arranged near the lower end of the weed guard curved portion 13. Once the weed guard is placed upon the fish hook, i.e., the body 6 extending through the slot end 19, it is shifted so that the trough section 14 engages the underside of the hook barb 8, and one of the holes 17 is in alignment with the hook eye 7 for coupling therewith. A snap clip 21, which is secured to the end of a fish line 22, is then applied so that a portion thereof will pass through the hook eye 7 and a hole 17, to couple the attachment portion 12 to the hook as best seen in FIG. 1. In such manner, the weed guard 11 is positionally maintained upon the fish hook, and will automatically adjust itself to prevent weed entanglement after being secured for the particular length of fish hook being used. It is to be noted that the relatively wide attachment portion 12, serves as a good base for the hook eye 7, so that tension of the snap clip 21, will assist in holding the eye in contact with the surface of the attachment portion, to thereby keep the weed guard in alignment. While a plurality of holes 17 has been specified, weed guards can be made with either one, two, or three holes, and the portion having holes not utilized may be cut off by the user if so desired.

The weed guard 11 may be made of any color plastic, such as white to produce a pork rind effect, or be colorless and transparent, if desired. Likewise it may be shaped to resemble certain types of natural bait, as illustrated in FIG. 4. The edge of attachment portion 12 may be scalloped between the holes 17, as shown, and an orangered color plastic used, to simulate a trout egg effect. In addition, a rubber imitiation worm 23, or other configuration 24, may be affixed to the curved portion 13 to cause a wiggling, or erratic motion, to catch fish attention.

From the foregoing it will be seen that the weed guard of the invention may be easily applied to a variety of fish hooks, will automatically adjust itself in proper position after being secured to a hook, will shield live bait as the hook assemblage is drawn through the water, and will provide a wiggling lure effect when used with offset hooks.

The foregoing description has been given in detail without thought of limitation since the inventive principles involved are capable of assuming other physical embodiments without departing from the spirit of the invention and the scope of the appended claim.

What is claimed is:

In combination with a fish hook and lure having a relatively straight shank provided at one end with an enlarged eye having a hole therethrough and lying in a horizontal plane including said shank and at its other end with an upwardly extending reverse bend which is horizontally offset from a vertical plane including said shank and terminates in a pointed end extending in the same general direction from said reverse bend as said shank, said eye having an annular bottom face surrounding the hole therein, and a lure body in simulation of live bait fixed to said shank and extending along said shank from adjacent said eye to adjacent said reverse bend; the combination therewith of a removable weed guard comprising a single one-piece strip made of a flexible plastic and including a flat base portion on the upper surface of which said eye is removably mounted and having a hole in register with said hole in said eye, and said strip including a finger portion rising from that end of said base portion close to the end of said eye from which said shank extends and having a slot embracing said shank and into which slot said shank is removably inserted, said finger portion being tapered to be of diminishing cross section from its base portion toward its outboard end and extending over said lure body toward said pointed end and terminating in a pair of upwardly extending wings forming an upwardly opening trough section in which said pointed end is seated, said offset bend holding said outboard end of said finger portion in offset relation to said vertical plane.

References Cited in the file of this patent
UNITED STATES PATENTS

| | | |
|---|---|---|
| 797,281 | Henzel | Aug. 15, 1905 |
| 808,239 | Homan | Dec. 26, 1905 |
| 1,290,571 | Kawasaki | Jan. 7, 1919 |
| 2,090,571 | Coffin | Aug. 17, 1937 |
| 2,234,516 | Clark | Mar. 11, 1941 |
| 2,507,454 | Nelson | May 9, 1950 |
| 2,516,399 | Lovelace | July 25, 1950 |
| 2,567,813 | Hyland | Sept. 11, 1951 |
| 2,785,498 | Youngquist et al. | Mar. 19, 1957 |
| 2,787,859 | Bay | Apr. 9, 1957 |